March 20, 1962 M. W. KELLY 3,025,915
IMPLEMENT DRAW-BAR FLOATING HITCH

Filed April 4, 1960 3 Sheets-Sheet 1

MUREL W. KELLY
*INVENTOR.*

BY Loyal J. Miller

ATTORNEY

MUREL W. KELLY
INVENTOR.

ATTORNEY

March 20, 1962 M. W. KELLY 3,025,915
IMPLEMENT DRAW-BAR FLOATING HITCH
Filed April 4, 1960 3 Sheets-Sheet 3

MUREL W. KELLY
INVENTOR.

ATTORNEY

United States Patent Office 3,025,915
Patented Mar. 20, 1962

3,025,915
IMPLEMENT DRAW-BAR FLOATING HITCH
Murel W. Kelly, Rte. 3, Box 161, Mangum, Okla.
Filed Apr. 4, 1960, Ser. No. 19,876
7 Claims. (Cl. 172—445)

The present invention relates to farm implements and more particularly to a draw-bar floating hitch.

One type of farming implement comprises a draw-bar carried transversely of the rearward end of a tractor by the hitch thereof and which supports a plurality of lister-type earth engaging tools or plows. Each end of the transverse support bar is supported by a vertically adjustable wheel which co-operates with the tractor hitch in maintaining the supporting bar parallel with the surface of the earth and governs the depth of penetration of the plow members. It is desirable that the shears of the plow, also, be parallel with the surface of the earth when plowing below the surface thereof. Such a position of the plow share is difficult to maintain by reason of the tilting action given the horizontal supporting bar when the depth of earth penetration of the plows is relatively shallow.

It is, therefore, the principal object of the instant invention to provide a floating type draw-bar hitch for connecting a plow implement supporting bar to the hydraulic lift of a tractor which will raise and lower the plow supporting bar without rotating the latter about its horizontal axis.

Another object is to provide an implement hitch of this class which will maintain the plow supporting bar parallel with respect to the surface of the earth.

Another object is to provide an implement hitch of this class which may be respectively connected with the conventional lift arms and trigger means of a conventional hydraulic tractor lift.

A further object is to provide a tractor hitch which will result in more efficient operation of the connected farming implement.

The present invention accomplishes these and other objects by connecting an auxiliary shaft to the plow supporting shaft which is in turn connected by linkage to the hydraulic lift draw-bars and trigger mechanism of the tractor.

Other objects will be apparent from the following description when taken in conjunction with the accompanying three sheets of drawings, wherein.

Like characters of reference designate like parts in those figures of the drawings in which they occur.

In the drawings.

Figure 1:
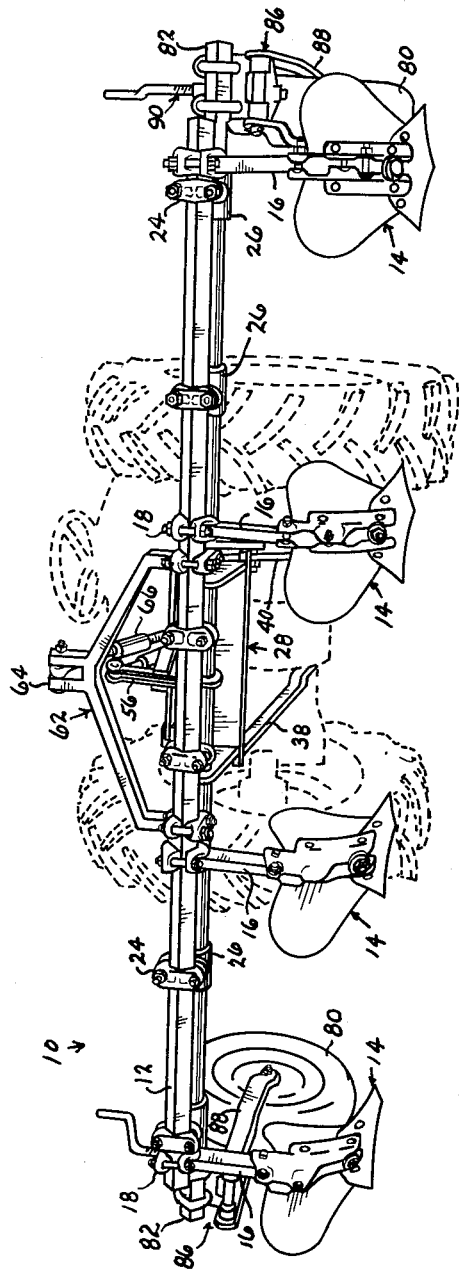
FIGURE 1 is a rearward perspective view of the plow implement connected to a tractor, the tractor being shown by dotted lines.

The reference numeral 10 indicates, as a whole, an earth engaging farm implement comprising a horizontally disposed plow support bar 12 to which a plurality of lister-type plow members 14 are rigidly connected by a like plurality of vertical shanks 16 and by clamp members 18 which latter may be adjustably positioned along the support 12. This type of implement is conventional and it is with such a device that the instant invention is designed to be connected.

In carrying out the invention, an elongated rod member 20 is connected in parallel spaced-apart relation forwardly of the support bar 12 by a plurality of forwardly extending bar members 22 rigidly connected at one end by a clamp 24 to the support 12. The other or forward end of each bar member 22 is rigidly secured to a sleeve 26 which surrounds the rod member 20.

Figure 3:
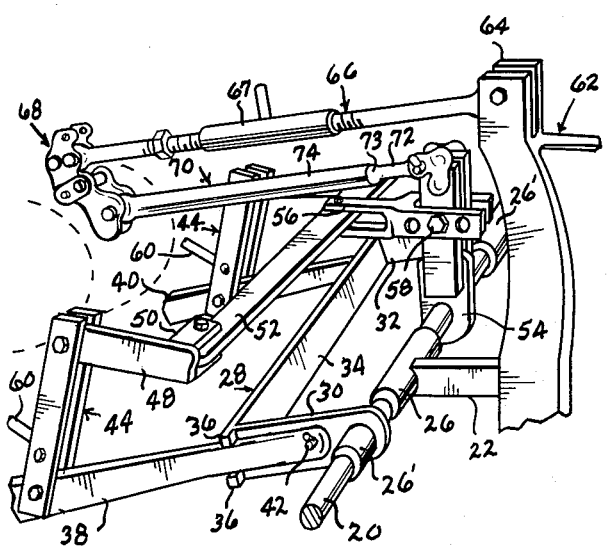
FIGURE 3 is a fragmentary perspective view of the implement hitch connected with a fragmentary portion of the tractor lift mechanism.
Figure 5:
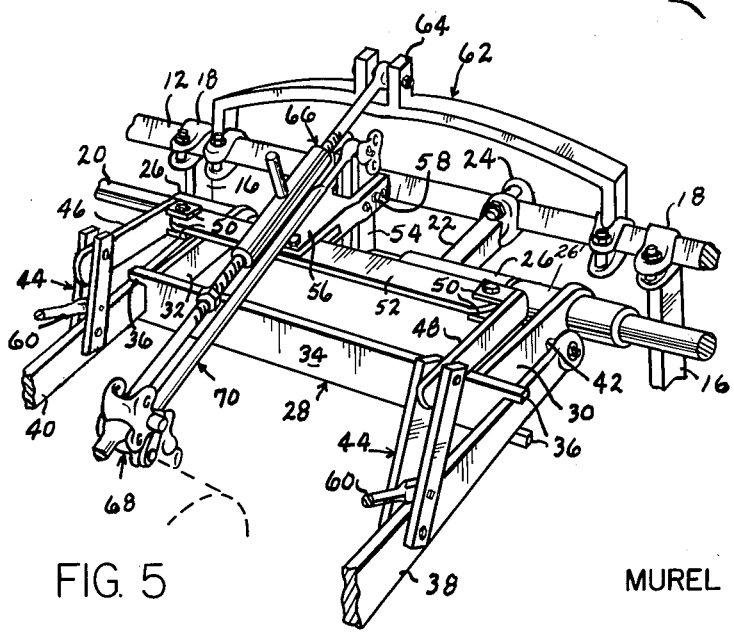

A substantially U-shaped yoke 28 has the free end portions of each of its legs 30 and 32 rigidly connected to a similar pair of sleeve members 26'. Each end of the bight portion 34 of the yoke projects laterally outward of each of the respective legs 30 and 32 and is bifurcated for forming a pair of vertically spaced-apart prongs 36 between which the respective draw-bar links 38 and 40 of the tractor hydraulic lift are received. The rearward end portion of each of the draw-bar links 38 and 40 are secured to the adjacent side of each respective leg 30 and 32, of the yoke, by pins 42, one of which is shown in FIGS. 3 and 5.

A pair of links 44 is pivotally connected at one end to opposing sides of each of the draw-bar links 38 and 40 intermediate their ends forwardly of the yoke 28. The upper end of each pair of links 44 is pivotally connected to one end, respectively, of a pair of arms 46 and 48. The rearward end of the arms 46 and 48 are each provided with a pair of lateral inwardly extending ears 50 between which a bar 52 extends and is pivotally connected adjacent its respective ends. An upstanding lever 54 is rigidly connected at its depending end to the rod member 20 medially the space between the yoke legs 30 and 32. A clevis-like member 56 is pivotally connected at its forward bifurcated end to the arm 52 medially the length of the latter and is adjustably connected at its rearward end by a bolt 58 extending horizontally through the clevis and lever 54.

Figure 4:
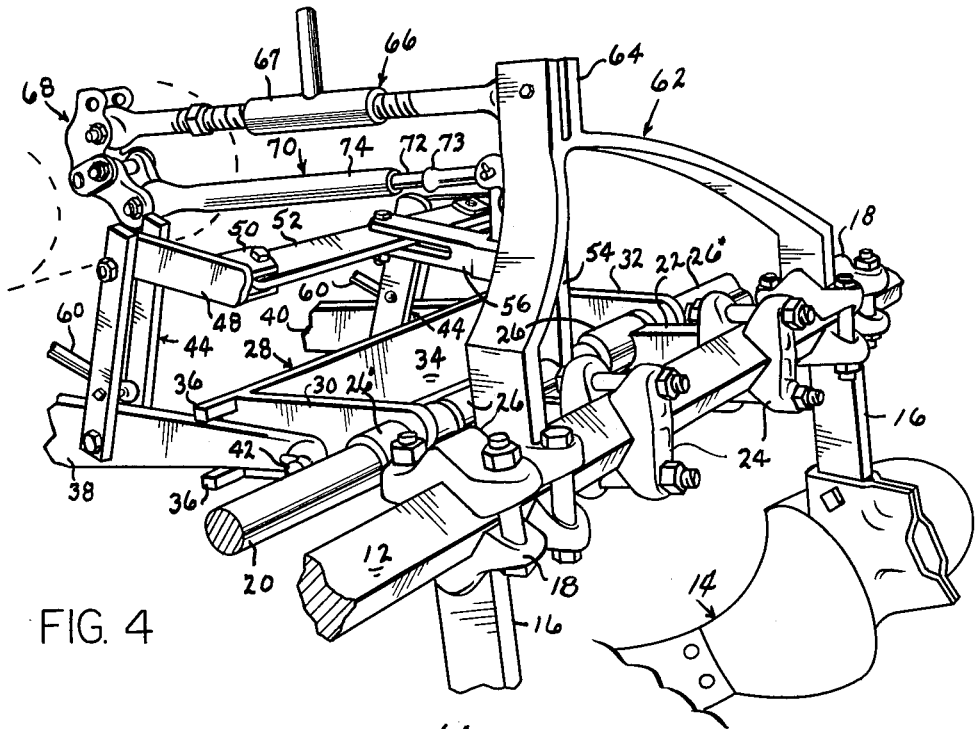
FIGURE 4 is a fragmentary view similar to FIG. 3, to an enlarged scale, illustrating the implement in earth engaging position; and, FIGURE 5 is a fragmentary three-quarter front perspective view of the floating hitch, illustrating the relationship of the hitch to the tractor draw-bars and plow supporting draw-bar.

The conventional tractor left arms 60 are each pivotally connected by their free end portions to the respective pairs of links 44. Thus when the lift arms 60 are raised, the rod 20 is raised horizontally by the draw-bars 38 and 40, yoke 28 and clevis 56. Lifting the rod 20 tends to lift the plow support 12, but, since the support 12 is pivotally supported by the rod 20 through the sleeves 26 connected with the links 22 some means must be provided to maintain the support 12 in the horizontal plane of the rod 20. This is accomplished by rigidly connecting the legs of an inverted substantially Y-shaped yoke 62 to the central portion of the support 12. The stem portion 64 of the yoke 62 is bifurcated for pivotal connection with one end of a first stabilizing arm 66. The forward end of the stabilizing arm 66 is connected to the trigger mechanism of the tractor, indicated generally at 68. Intermediate its ends the first stabilizing rod is divided and oppositely threaded for connection with a collar 67 for adjusting the length of the rod. A second stabilizing arm 70 is connected at one end to the tractor trigger 68. The arm 70 includes a rod member 72 telescopingly received by a sleeve portion 74. The second stabilizing arm extends rearwardly below and parallel with the first stabilizer arm 66 and is pivotally connected to the uppermost end portion of the lever 54, thus when the plows 14 are in earth engaging position, as shown by FIG. 4, the rod 72 is moved outwardly in the sleeve 74 while the first stabilizer arm 66 maintains the support 12 in the same horizontal plane with respect to the rod 20. Lifting movement of the rod 20, by the tractor lift arms 60, slides the stabilizer arm rod 72 into the sleeve to the position shown in FIG. 3, wherein a stop 73, formed on the rod 72, contacts the adjacent end of the sleeve 74. Thus it may be seen that regardless of the horizontal elevation of the rod 20, assumed by movement of the tractor lift arms 60, the first stabilizer arm 66 maintains the support 12 in a horizontal plane common to the draw-bar 12 and tractor draw-bars 38 and 40 which maintains the shears of the plow members 14 parallel with the surface of the earth when plowing or lifted above the surface of the earth.

Figure 2:
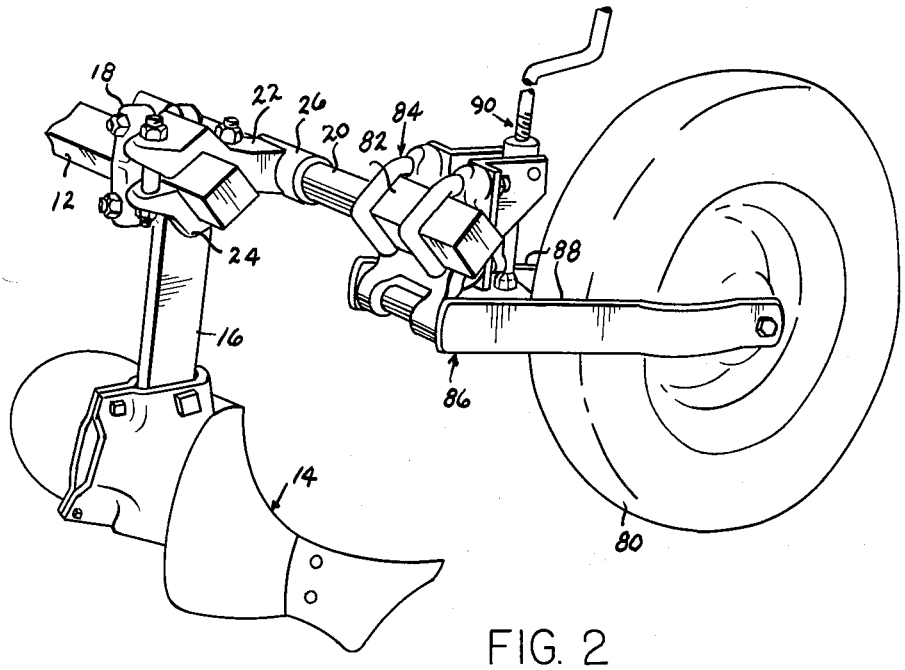
FIGURE 2 is a fragmentary perspective view, to an enlarged scale, of one end portion of the implement and its plow depth regulating wheel.

The depth regulating wheels 80, conventionally carried by the respective outer end portion of the support 12, are each connected with the outwardly disposed end portion of the rod 20, as best seen in FIG. 2. A substantially square section of metal 82 is welded, in longitudinal alignment, to the outermost end of the rod 20 around which the wheel supporting clamp means 84 is connected. A fork 86, pivotally supported by the clamp means 84, journals the respective wheel 80 on a horizontal axis between a pair of legs 88 of the fork. Screw crank means 90, threadedly connected with the wheel support clamp means 84 and contacting the fork 86 provide a means for vertical adjustment of the wheel with respect to the horizontal axis of the rod 20. The purpose of the wheel 80 is to support the respective end portions of the plow and regulate the depth of earth penetration of the latter in a floating action. When either of the wheels 80 contacts an uneven surface of the earth, for example, a ridge of ground running parallel to the direction of travel of the wheel, upward movement of the wheel tends to rotate the shaft 20 about its longitudinal axis separating the two members of the second stabilizer arm 70 and simultaneously moving the upper end of the lever 54 rearwardly, pulling on the bar 52, which through its linkage connection with the draw-bars or draft arms 38 and 40, tends to urge the latter upwardly against the fixed position of the tractor lift arms 60 thus permitting additional depth of penetration of the plow members 14. This compensates for the distance the respective wheel 80 is raised above the plane defining the surface of the earth on either side of the ridge contacted by the wheel. Similarly when the wheel leaves the ridge or raised area, the shaft 20 is rotated in a direction opposite to the first mentioned direction telescoping the rod 72 into the sleeve 74 wherein the lever 54 regains its vertical position and wherein the plows maintain their depth of earth penetration. During this action the position of the plows, with respect to the earth, are maintained by the Y-shaped yoke 62 and its connection with the tractor trigger mechanism 68 through the stabilizer arm 66.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A plow attachment for connecting a plow to a tractor, said tractor having hydraulic lift means including draw-bars, lift arms and a trigger mechanism, said plow having a horizontally disposed support, comprising: a transverse shaft pivotally connected, in parallel spaced relation, to said plow support; a U-shaped yoke connected with said tractor draw-bars and pivotally connected to said shaft; an upstanding lever rigidly connected to said shaft; linkage means extending between and pivotally connected with said tractor draw-bars, said tractor lift arms and said lever for vertical movement of said shaft in response to vertical movement of said lift arms; an inverted substantially Y-shaped yoke rigidly connected with said plow support; and first and second stabilizer arms pivotally connected at one end to said tractor trigger mechanism and pivotally connected at their other ends to said Y-shaped yoke and said lever, respectively.

2. A plow hitch for connecting a plow to a tractor, said tractor having hydraulic lift means, said plow having a horizontally disposed support, comprising: an elongated shaft connected in parallel spaced relation to said plow support; a substantially U-shaped member connected to said tractor hydraulic lift means and pivotally connected by the end portions of its legs to said shaft; an upstanding lever rigidly connected to said shaft medially the ends of the latter; linkage extending between and connected with said hydraulic lift means and said lever for raising and lowering said shaft in response to vertical movement of said hydraulic lift; an inverted Y-shaped yoke rigidly connected by its legs to said plow support; and a pair of stabilizer links extending between and connected, at one end, in parallel relation to said hydraulic lift means and connected, at their other ends, to the upper end portion of said lever and said Y-shaped yoke, respectively, for maintaining said plow support and said shaft in a common horizontal plane when the hydraulic lift is vertically reciprocated.

3. Structure as specified in claim 2 and a wheel fork vertically adjustably connected to the outermost end portions of said shaft; and a wheel journaled by each said wheel fork for supporting the end portions of said shaft and maintaining a constant depth of earth penetration by said plow.

4. A hitch for connecting a plowing implement to a tractor, said tractor having a hydraulic lift mechanism including a pair of draw-bars, said plow implement having a horizontally disposed support, comprising: a horizontally disposed elongated rod-like shaft; a plurality of sleeves surrounding said shaft; bars extending between certain of said sleeves and said support and rigidly connected at their respective ends thereto; a substantially U-shaped yoke connected with said hydraulic lift and rigidly connected by the end portions of its legs to a pair of said sleeves; a pair of links pivotally connected to the draw-bars of said hydraulic lift; linkage extending between and connected to the upper ends of said pairs of links; an upstanding lever rigidly connected to said shaft; a clevis extending between said linkage and the upper end of said lever; an inverted Y-shaped yoke rigidly connected by the end portions of its legs to said support; a first stabilizer arm member extending between said hydraulic lift and said Y-shaped yoke; and a second telescoping stabilizer arm extending between said hydraulic lift and the upper end of said lever permitting pivoting movement of said U-shaped member and said sleeves about the horizontal axis of said shaft as said hitch is vertically reciprocated by the movement of said hydraulic lift.

5. Structure as specified in claim 4 and a pair of fork legs connected, at one end, with the outermost end portions of said shaft, the other end portions of said pair of fork legs being vertically adjustable with respect to the axis of said shaft; and a wheel journaled between each said pair of fork legs whereby upward movement of either of said wheels rotates said shaft about its longitudinal axis and lowers said plow support with respect to the surface of the earth.

6. A hitch for connecting a plowing implement to a tractor, said tractor having a hydraulic lift mechanism including a pair of draw-bars, said plow implement having a horizontally disposed support, comprising: a horizontally disposed elongated rod-like shaft, pivotally connected in spaced relation to said support for rotation about its longitudinal axis; a plurality of sleeves surrounding said shaft; a substantially U-shaped yoke connected with said hydraulic lift and rigidly connected by the end portions of its legs to a pair of said sleeves; a pair of links pivotally connected to the draw-bars of said hydraulic lift; linkage extending between and connected to the upper ends of said pairs of links; an upstanding lever rigidly connected to said shaft; a clevis extending between said linkage and the upper end of said lever; an inverted Y-shaped yoke rigidly connected by the end portions of its legs to said support; a first longitudinally adjustable stabilizer arm extending between said hydraulic lift and said Y-shaped yoke; and a second telescoping stabilizer arm extending between said hydraulic lift and the upper end of said lever permitting pivoting movement of said U-shaped member and said sleeves about the horizontal axis of said shaft as said hitch is vertically reciprocated by the movement of said hydraulic lift.

7. Structure as specified in claim 6 and a wheel fork pivotally connected at one end to the respective end portions of said shaft; a wheel journalled by said wheel fork mounted on a horizontal axle, parallel with and off-set forwardly of the longitudinal axis of said shaft; and screw crank means connected with said shaft and contacting said wheel fork for adjustably limiting the upward movement of the free end portion of the latter with respect to the axis of said shaft whereby upward movement of either of said wheels rotates said shaft about its longitudinal axis and lowers said plow support with respect to the surface of the earth.

References Cited in the file of this patent
UNITED STATES PATENTS

| | | |
|---|---|---|
| 2,739,694 | Klemm et al. | June 12, 1956 |
| 2,755,722 | Fraga | July 24, 1956 |
| 2,790,366 | McKinzie | Apr. 30, 1957 |
| 2,915,130 | Todd | Dec. 1, 1959 |
| 2,947,367 | Orelind et al. | Aug. 2, 1960 |